United States Patent
Lochbaum et al.

(10) Patent No.: US 9,380,078 B2
(45) Date of Patent: Jun. 28, 2016

(54) METHOD AND SYSTEM TO ADD VIDEO CAPABILITY TO ANY VOICE OVER INTERNET PROTOCOL (VO/IP) SESSION INITIATION PROTOCOL (SIP) PHONE

(75) Inventors: Andrew Lochbaum, Cedar Park, TX (US); Krishna Sai, Cedar Park, TX (US)

(73) Assignee: Polycom, Inc., San Jose, CA (US)

( * ) Notice: Subject to any disclaimer, the term of this patent is extended or adjusted under 35 U.S.C. 154(b) by 1478 days.

(21) Appl. No.: 12/784,563

(22) Filed: May 21, 2010

(65) Prior Publication Data

US 2011/0289201 A1 Nov. 24, 2011

(51) Int. Cl.
*G06F 15/16* (2006.01)
*H04L 29/06* (2006.01)
*H04L 12/58* (2006.01)

(52) U.S. Cl.
CPC ........ *H04L 65/1053* (2013.01); *H04L 12/5825* (2013.01); *H04L 65/1006* (2013.01); *H04L 65/1073* (2013.01)

(58) Field of Classification Search
CPC ........................ H04L 65/1073; H04L 12/5825
USPC ............ 709/228, 226; 370/352–356; 715/753
See application file for complete search history.

(56) References Cited

U.S. PATENT DOCUMENTS

| | | | | |
|---|---|---|---|---|
| 8,180,906 | B2 * | 5/2012 | Attanasio et al. | 709/228 |
| 2003/0009561 | A1 * | 1/2003 | Sollee | 709/227 |
| 2005/0165917 | A1 * | 7/2005 | Le et al. | 709/220 |
| 2005/0249196 | A1 * | 11/2005 | Ansari et al. | 370/352 |
| 2007/0286163 | A1 * | 12/2007 | Oka et al. | 370/352 |
| 2008/0002614 | A1 * | 1/2008 | Hanabusa et al. | 370/328 |
| 2008/0170563 | A1 * | 7/2008 | Zhu et al. | 370/352 |
| 2009/0010247 | A1 * | 1/2009 | Stille | 370/352 |
| 2009/0232129 | A1 * | 9/2009 | Wong et al. | 370/352 |
| 2010/0057920 | A1 * | 3/2010 | Lee et al. | 709/228 |
| 2010/0199320 | A1 * | 8/2010 | Ramanathan et al. | 725/109 |
| 2011/0061005 | A1 * | 3/2011 | Zha | 715/753 |

* cited by examiner

*Primary Examiner* — Aftab N. Khan
(74) *Attorney, Agent, or Firm* — Blank Rome, LLP (57) ABSTRACT

Systems and methods of configuring an add-on device to augment the capability of existing endpoint infrastructure are disclosed. In one embodiment, a video add-on device is configured to receive, augment or downgrade, and forward messages for an existing SIP audio-only phone. The video add-on device in this embodiment can receive messages from the existing SIP audio-only phone and augment the messages with information regarding the additional video capabilities being provided. The messages can then be forwarded to an infrastructure SIP Proxy/Registrar for further routing. From the perspective of the infrastructure SIP Proxy/Registrar and other network attached devices the outbound messages from the video add-on device appear as if they originated from the video add-on device, other devices will not be directly aware of the existing SIP audio phone providing its designed function. Utilizing devices similar to the disclosed video add-on device may allow incremental corporate network endpoint upgrades.

24 Claims, 7 Drawing Sheets

```
INVITE sip:172.26.48.118 SIP/2.0
Via: SIP/2.0/UDP 172.26.48.2;branch=z9hG4bK7d1ff56bE5184A2A
From: "1041" <sip:1041@vsg.local>;tag=A0CA2D21-9836C638
To: <sip:172.26.48.118>
CSeq: 1 INVITE
Call-ID: 50f72da5-b12db9cc-2790ac4f@172.26.48.2
Contact: <sip:1041@172.26.48.2>
Allow: INVITE, ACK, BYE, CANCEL, OPTIONS, INFO, MESSAGE, SUBSCRIBE, NOTIFY, PRACK
User-Agent: PolycomSoundStationIP-SSIP_7000-UA/3.2.3.0670
Accept-Language: en
Supported: 100rel,replaces                                          450
Allow-Events: talk,hold,conference
Max-Forwards: 70
Content-Type: application/sdp
Content-Length: 981
```

MODIFIED TEXT IN BOLD (SEE ALSO ELEMENT 410 FIG 4A)

```
v=0
o=- 1273249833 1273249833 IN IP4 172.26.48.2
s=Polycom IP Phone
c=IN IP4 172.26.48.2
t=0 0
a=sendrecv
m=audio 49292 RTP/AVP 106 115 99 9 102 0 8 18 101
a=rtpmap:106 SIREN22/48000
a=fmtp:106 bitrate=64000
a=rtpmap:115 G7221/32000
a=fmtp:115 bitrate=48000
a=rtpmap:99 SIREN14/16000
a=fmtp:99 bitrate=48000
a=rtpmap:9 G722/8000
a=rtpmap:102 G7221/16000
a=fmtp:102 bitrate=32000
a=rtpmap:0 PCMU/8000
a=rtpmap:8 PCMA/8000
a=rtpmap:18 G729/8000
a=fmtp:18 annexb=no
a=rtpmap:101 telephone-event/8000
```

Modified Message from Video Add-on Device to Proxy Server.

ADDED TEXT IN BOLD

```
m=video 49294 RTP/AVP 109 96 34 31
b=TIAS:384000
a=rtpmap:109 H264/90000
a=fmtp:109 profile-level-id=428016; max-mbps=108000; max-fs=3600; sar=13
a=rtpmap:96 H263-1998/90000
a=fmtp:96 CIF4=2;CIF=1;QCIF=1;SQCIF=1;CUSTOM=352,240,1;CUSTOM=704,480,2;F;J;T
a=rtpmap:34 H263/90000
a=fmtp:34 CIF4=2;CIF=1;QCIF=1;SQCIF=1;F
a=rtpmap:31 H261/90000
a=fmtp:31 CIF=1;QCIF=1
a=sendrecv
a=rtcp-fb:* ccm fir tmmbr
m=application 49298 RTP/AVP 100
a=rtpmap:100 H224/4800
a=sendrecv
```

METHOD AND SYSTEM TO ADD VIDEO CAPABILITY TO ANY VOICE OVER INTERNET PROTOCOL (VO/IP) SESSION INITIATION PROTOCOL (SIP) PHONE

FIELD OF DISCLOSURE

This disclosure relates generally to the field of audio and video conferencing. More particularly, but not by way of limitation, to a method of augmenting a Session Initiation Protocol (SIP) message and its corresponding Session Description Protocol (SDP) definition to allow additional capabilities while maintaining a viable interface to another device (e.g., a legacy device).

BACKGROUND

Session Initiation Protocol (SIP) is an Internet Engineering Task Force (IETF) defined signaling protocol, used for controlling multimedia communication sessions such as voice and video calls over Internet Protocol (IP). The protocol can be used for creating, modifying and terminating two-party (unicast) or multiparty (multicast) sessions consisting of one or several media streams. The modifications can involve changing addresses or ports, inviting more participants, adding or deleting media streams, etc. Other application examples include video conferencing, streaming multimedia distribution, instant messaging, presence information and online gaming.

The SIP protocol is an IP-based Application Layer protocol. SIP is designed to be independent of the underlying transport layer. SIP can run on Transmission Control Protocol (TCP), User Datagram Protocol (UDP), or Stream Control Transmission Control Protocol (SCTP). SIP is a text-based protocol (e.g., ASCII text encoded). SIP incorporates many elements of the Hypertext Transfer Protocol (HTTP) and the Simple Mail Transfer Protocol (SMTP).

SIP employs design elements similar to the HTTP request/response transaction model. Each transaction consists of a client request that invokes a particular method or function on the server and at least one response. SIP reuses most of the header fields, encoding rules and status codes of HTTP and providing a readable text-based format.

SIP works in concert with several other protocols and is only involved in the signaling portion of a communication session. SIP clients typically use TCP or UDP on port numbers 5060 and/or 5061 to connect to SIP servers and other SIP endpoints. SIP is primarily used for setting up and tearing down voice or video calls. The voice and video stream communications in SIP applications are carried over another application protocol such as Real-time Transport Protocol (RTP). Parameters (e.g., port numbers, protocols, codecs) for corresponding media streams are defined and negotiated using the Session Description Protocol (SDP) which is transported in the SIP packet body. SIP and SDP are defined in the IETF Request For Comment (RFC) documents 3261 and 4566 each of which are incorporated by reference in their entirety herein.

A SIP user agent (UA) is a logical network end-point used to create or receive SIP messages and thereby manage a SIP session. A SIP UA can perform the role of a User Agent Client (UAC), which sends SIP requests, and a User Agent Server (UAS), which receives the requests and returns a SIP response. These roles of UAC and UAS typically only last for the duration of a SIP transaction. A SIP phone is a SIP UA that provides the traditional call functions of a telephone, such as dial, answer, reject, hold/unhold, and call transfer. SIP phones may be implemented by dedicated hardware controlled by the phone application directly or through a combination of hardware, software and firmware. SIP phones can be any phone with IP connectivity including traditional desktop phones, cell phones, smart phones or Personal Digital Assistants (PDAs), etc.

Each resource of a SIP network, such as a User Agent or a voicemail box, is identified by a Uniform Resource Identifier (URI), based on the general standard syntax also used in Web services and e-mail. A typical SIP URI is of the form: sip:username:password@host:port. The URI scheme used for SIP is sip:. If secure transmission is required a message may be encrypted and a scheme of sips: is used and corresponding messages are transported over Transport Layer Security (TLS).

SIP also defines server network elements as outlined in RFC 3261. A "proxy server" is an intermediary entity that acts as both a server and a client for the purpose of making requests on behalf of other clients. A proxy server primarily plays the role of routing, which means its job is to ensure that a request is sent to another entity "closer" to the targeted user. Proxies are also useful for enforcing policy (e.g., making sure a user is authorized to make a call). A proxy interprets, and if necessary, rewrites specific parts of a request message before forwarding the message. A registrar is a server that accepts REGISTER requests and places the information it receives in those requests into the location service for the domain it handles. The RFC for SIP specifies that it is an important concept that the distinction between types of SIP servers is logical, not physical. In practice, different logical capabilities of SIP can be performed by one server or split across a plurality of physical devices as required by design choices.

As mentioned above, SDP is a format for describing streaming media initialization parameters in an ASCII string. SDP is intended for describing multimedia communication sessions for the purposes of session announcement, session invitation, and parameter negotiation. SDP does not deliver media itself but is used for negotiation between end points of media type, format, and all associated properties. The set of properties and parameters are often referred to as a session profile.

A Session Description is a well defined format for conveying sufficient information to discover and participate in a multimedia session. A session is described by a series of attribute/value pairs, one per line. The attribute names are single characters, followed by "=", and a value. Optional values are specified with "=*". Values are either in an ASCII string, or a sequence of specific types separated by spaces. Attribute names are only unique within the associated syntactic construct, i.e., within the Session, Time, or Media only.

Figure 1A:
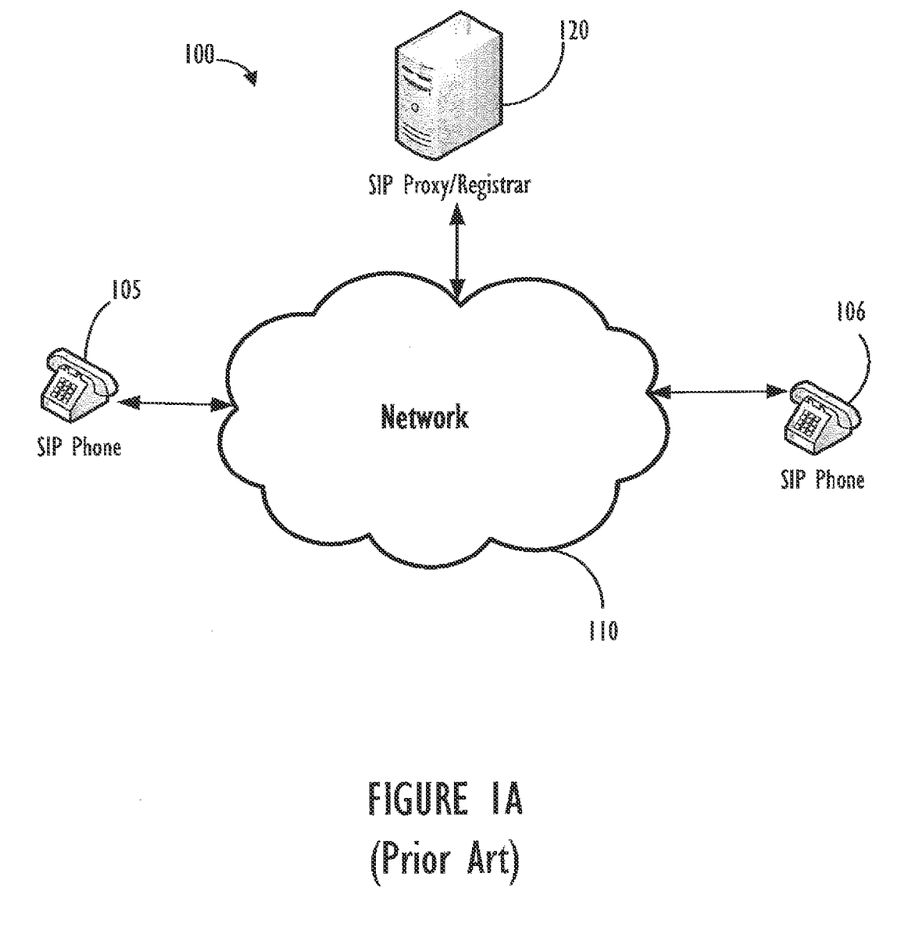
FIG. 1A shows, in block diagram form, a prior art network topology for VoIP phones connected utilizing SIP.

FIG. 1A shows a typical network topology (diagram 100) for a SIP based phone environment as may be found in the prior art. Network diagram 100 shows a pair of SIP phones (105, 106) connected to IP network 110 and configured for Voice over IP (VoIP) phone calls. SIP Proxy and SIP Registrar functions are provided by SIP Proxy/Registrar server 120. In this example both of these logical functions have been included with a single server 120, however, these functions may also be implemented on two distinct hardware servers.

Figure 1B:
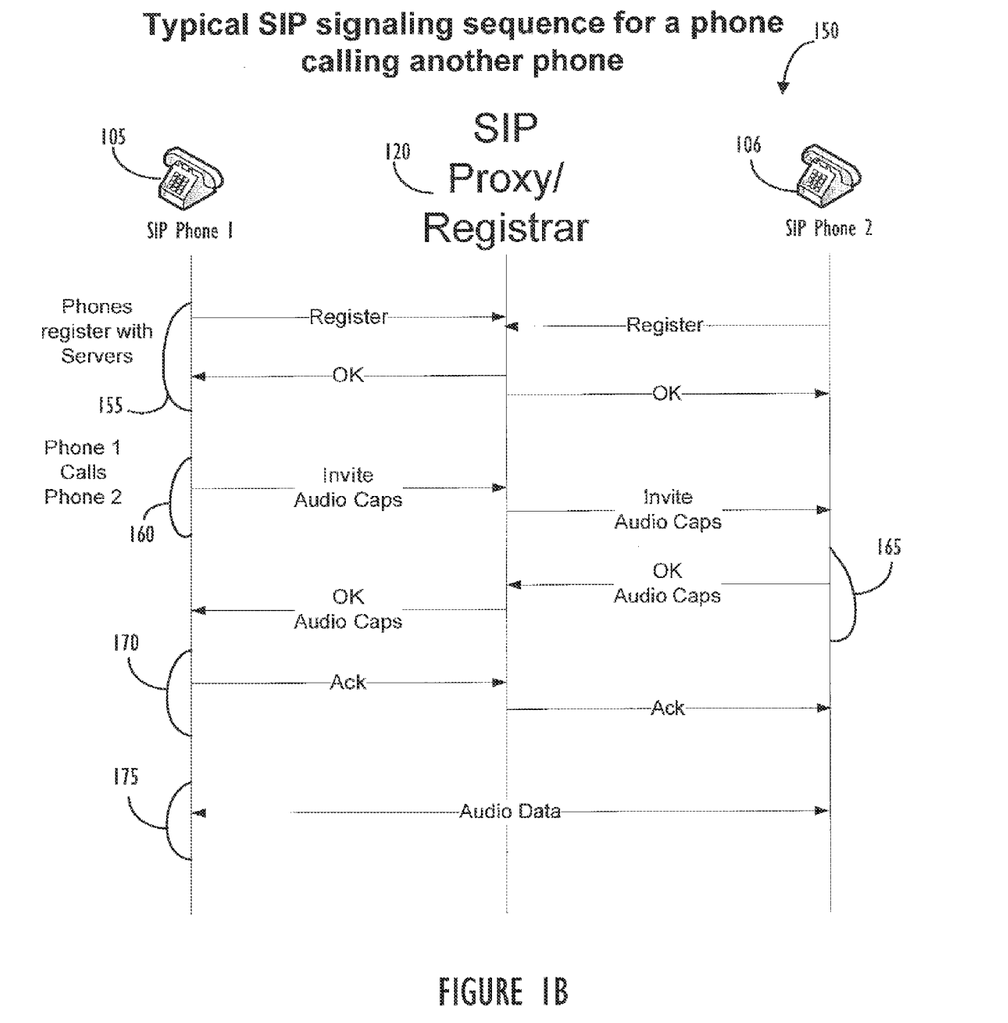
FIG. 1B shows a timeline of steps required to establish (via SIP) a VoIP phone call.

FIG. 1B shows a timeline 150 of a typical prior art process of utilizing SIP to signal from a first phone to a second phone to establish a call utilizing example pieces of network 100. Initially (time 155), each phone will register with a SIP Registrar/Proxy server via a REGISTER message. The information for this registration can be preconfigured into the device or each device can be provisioned utilizing a mechanism similar to Dynamic Host Configuration Protocol (DHCP).

After, the phones have established their connection to the Proxy/Registrar infrastructure they are each capable of making/receiving phone calls. In timeline 150, phone 1 (105) calls phone 2 (106) by sending (time 160) an INVITE message to the Proxy/Registrar server 120 with the INVITE message addressed to phone 2 (106). The Proxy/Registrar server will interrogate the message and locate/forward the INVITE message toward a network destination "closer" to phone 2 (106). Upon receipt at phone 2 (106), phone 2 (106) will respond with an OK message (time 165) if it is ready and able to accept the phone call. The INVITE message and the OK response include information about the audio capabilities of each of devices 105 and 106 such that a negotiation for a particular type of transmission of data may take place. Phone 1 (105) responds with an ACK message (time 170) to phone 2 (106) indicating how to establish the data transfer communication session for a VoIP phone call as shown at time 175.

Prior art networks such as 100 primarily consist of SIP endpoints configured for a particular function and having hardware components compatible with that particular function. Upgrading of endpoints to support enhanced functionality typically requires replacing a hardware component that is acting as an endpoint. Alternatively, there have been prior art devices which split the audio and video processing between devices, however those devices involve two devices with required embedded information and having a private means of communication and coordination between each of the two devices. Accordingly, it is desirable to provide a method and device capable of augmenting capabilities at an existing endpoint without being required to replace a legacy (or less capable) endpoint device and without requiring a private means of communication and coordination between devices. For example, a SIP audio-only phone (e.g., 105, 106) may be augmented to a video phone while still providing its original audio-only capability by using the methods and systems disclosed herein.

SUMMARY

In one embodiment, an add-on device is added to an existing corporate network to upgrade an existing SIP audio-only phone to an endpoint supporting full audio/video conferencing capability. The add-on device can function as a transparent intermediary to the existing SIP audio-only phone. As messages are received from the SIP phone at the video add-on device they can be augmented to include video attributes. As messages are received at the video add-on device from other devices in the network they can be stripped of the video attributes and altered to only carry audio data as expected by the SIP phone. Utilizing this method and system capabilities can be added to an existing corporate network without having to replace all of the equipment at the upgraded endpoint location. Further, the existing equipment can continue to function as it was originally designed and not require special data connections or updates.

In another embodiment, the add-on device can augment outbound messages from a H.323 device and downgrade inbound messages to the H.323 device to support a capability like video, camera control and room control in conjunction with the standard capability of audio.

DETAILED DESCRIPTION

The following disclosure describes a method and system to augment the capabilities of a SIP endpoint without replacing the existing endpoint. In one embodiment the method comprises adding an additional device between the existing endpoint and a SIP Proxy/Registrar server to provide the augmented capability. The add-on device can appear to the existing endpoint as a SIP Proxy/Registrar server and effectively act as a bridge, gateway or router to a SIP Proxy/Registrar already available in the network infrastructure. The add-on device can either add (for outbound traffic) or remove (for inbound traffic) portions of the messages that are not supported by the original SIP endpoint device.

The following disclosure is described in the context of adding video capability to an existing voice only SIP phone. Other implementations and augmentation capabilities will be apparent to those skilled in the art, given the benefit of this disclosure. For example, the same affects can be achieved with H.323 where the add-on device inserts itself in the call path via gatekeeper signaling. In addition to video, capabilities such as far end camera control, far end room control (lighting, blinds, etc), serial pass through and application sharing could be added to the endpoint. Another example of augmentation could be the insertion of an electronic whiteboard application/device instead of or in addition to a video device. Note the add-on device is not assuming the role of a formal SIP Proxy/Registrar. Instead the end device is configured to think the add-on device is a SIP Proxy/Registrar and the add-on device can simply pass and augment the messages on their way to the real infrastructure SIP Proxy/Registrar. In this manner the add-on device can be placed transparently into the message flow.

Figure 2:
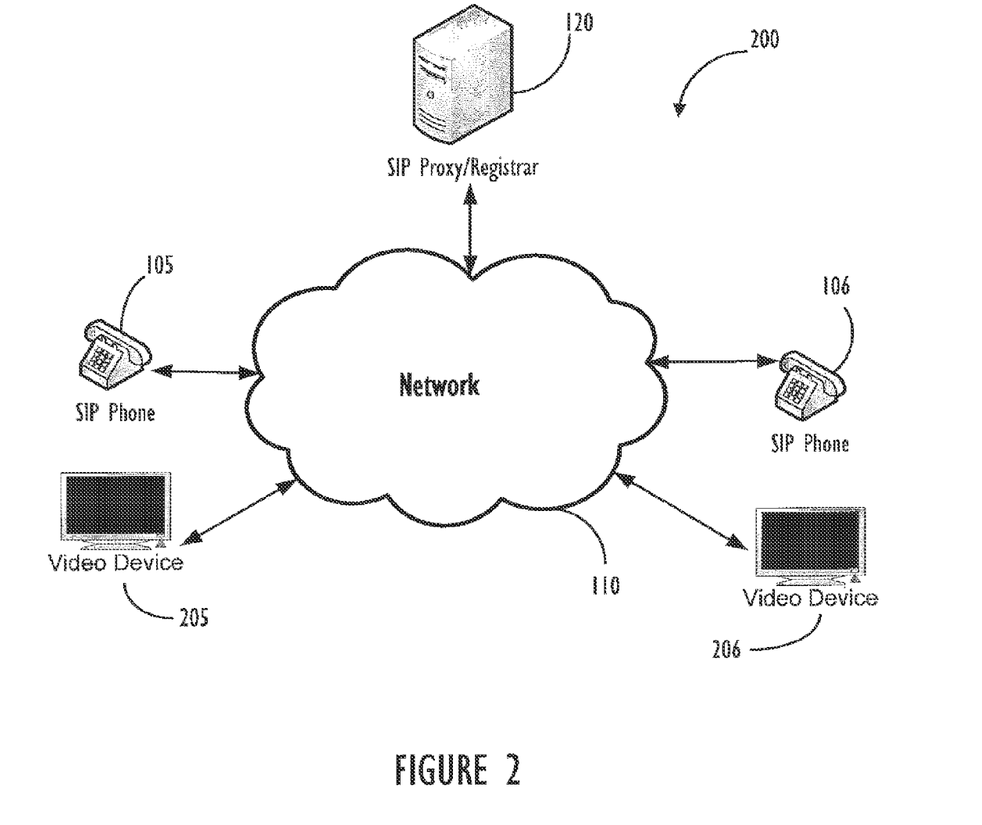
FIG. 2 shows, in block diagram form, a network topology for augmenting a SIP based audio-only phone device to support full video conferencing based on one disclosed embodiment.
Figure 3:
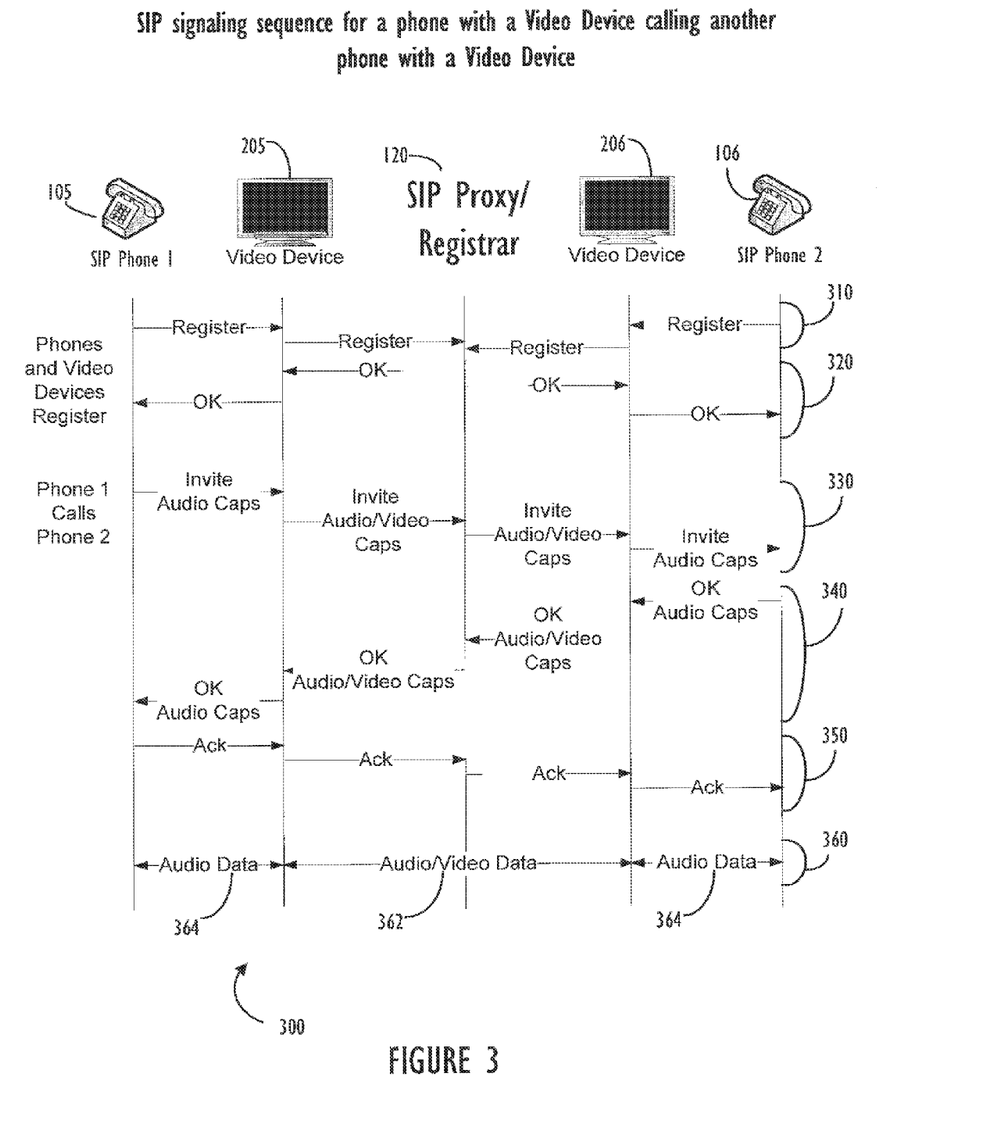
FIG. 3 shows a timeline of steps required to establish (via SIP) a video conference utilizing a video device and an audio-only phone according to one disclosed embodiment.

Referring now to FIGS. 2 and 3, network diagram 200 shows an augmented version of network diagram 100 (described above) in which video add-on devices 205 and 206 have been connected to extend the technical capabilities of SIP phones 105 and 106 respectively. Timing diagram 300 outlines example steps for SIP signaling from a phone 105 to a phone 106 including a video capability provided by video add-on devices 205 and 206. Initially at time segment 310 SIP phone 105 transmits a register request which is sent to video add-on device 205. Video add-on device 205 forwards the request on to the SIP Proxy/Registrar In a similar manner SIP phone 106 transmits it request to video add-on device 206 which forwards the request on to the SIP Proxy/Registrar 120. Next, at time segment 320, OK messages are returned from each SIP Proxy/Register logical component to the device which sent the REGISTER message. Now devices 105, 106, 205 and 206 are ready to place or receive calls.

As mentioned above SIP VoIP calls begin with an INVITE message as shown at time segment 330. Note that the invite message from SIP phone 105 routes to video device 205 and includes the audio capabilities of SIP phone 105. Video device 205 augments the INVITE message to include video capabilities of SIP video add-on device 205 and forwards the message to SIP Proxy/Registrar 120. From the viewpoint of SIP Proxy/Registrar 120 video add-on device appears to be a device with both video and audio capabilities. Placement of this example call continues with SIP Proxy/Registrar 120 sending the augmented INVITE message to SIP video add-on device 206. SIP video add-on device 206 receives the INVITE message, removes attributes associated with video capabilities from the INVITE message and forwards the INVITE message (still containing audio capability information) to SIP phone 106.

SIP phone 106 can respond with an OK message including its audio capabilities to facilitate negotiation of parameters for a connection. The OK message from SIP phone 106 is routed to video add-on device 206 which augments the message with supported video capabilities and forwards the augmented message to SIP Proxy/Registrar 120. SIP Proxy/Registrar 120 recognizes that this OK message is for video add-on device 205 and forwards the message toward video add-on device 205. Upon receipt, video add-on device 205 can remove and process the video only portions of the OK message and forward the remaining portions to SIP phone 105. At time segment 350, an ACK message is routed from SIP phone 105 toward SIP phone 106 taking the required route of 205, 120 and 206. After the ACK message has been received by SIP phone 106, a video and audio phone call can take place as shown at time segment 360. Note that for the duration of this call only audio data is sent and received by SIP phones 105 and 106 in contrast to the audio/video data sent between video add-on devices 205, 206 and SIP Proxy/Registrar 120.

Figure 4A:
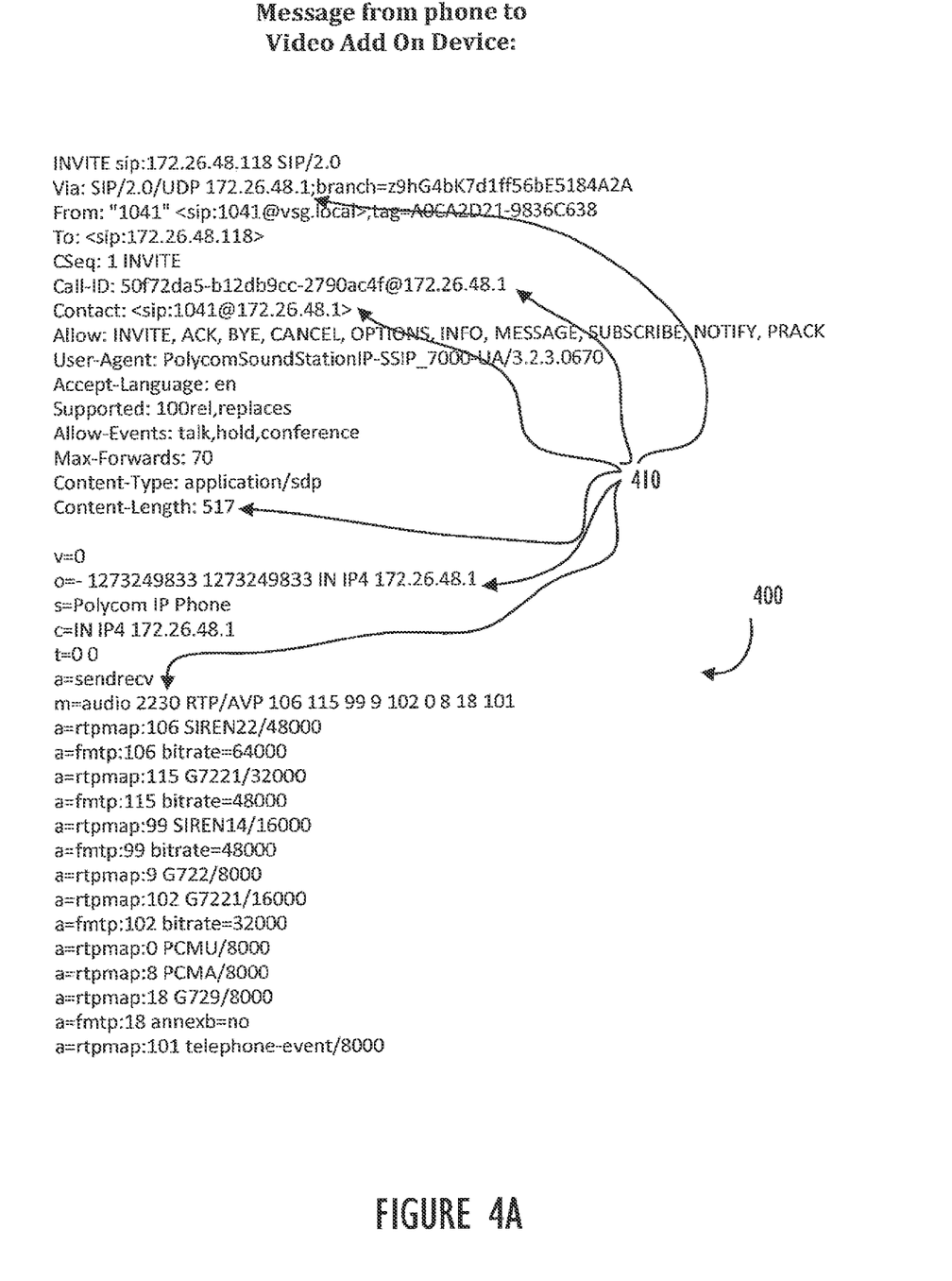
FIGS. 4A-B show a SIP INVITE message from an audio-only phone to a video add-on device according to one disclosed embodiment.
Figure 4B:
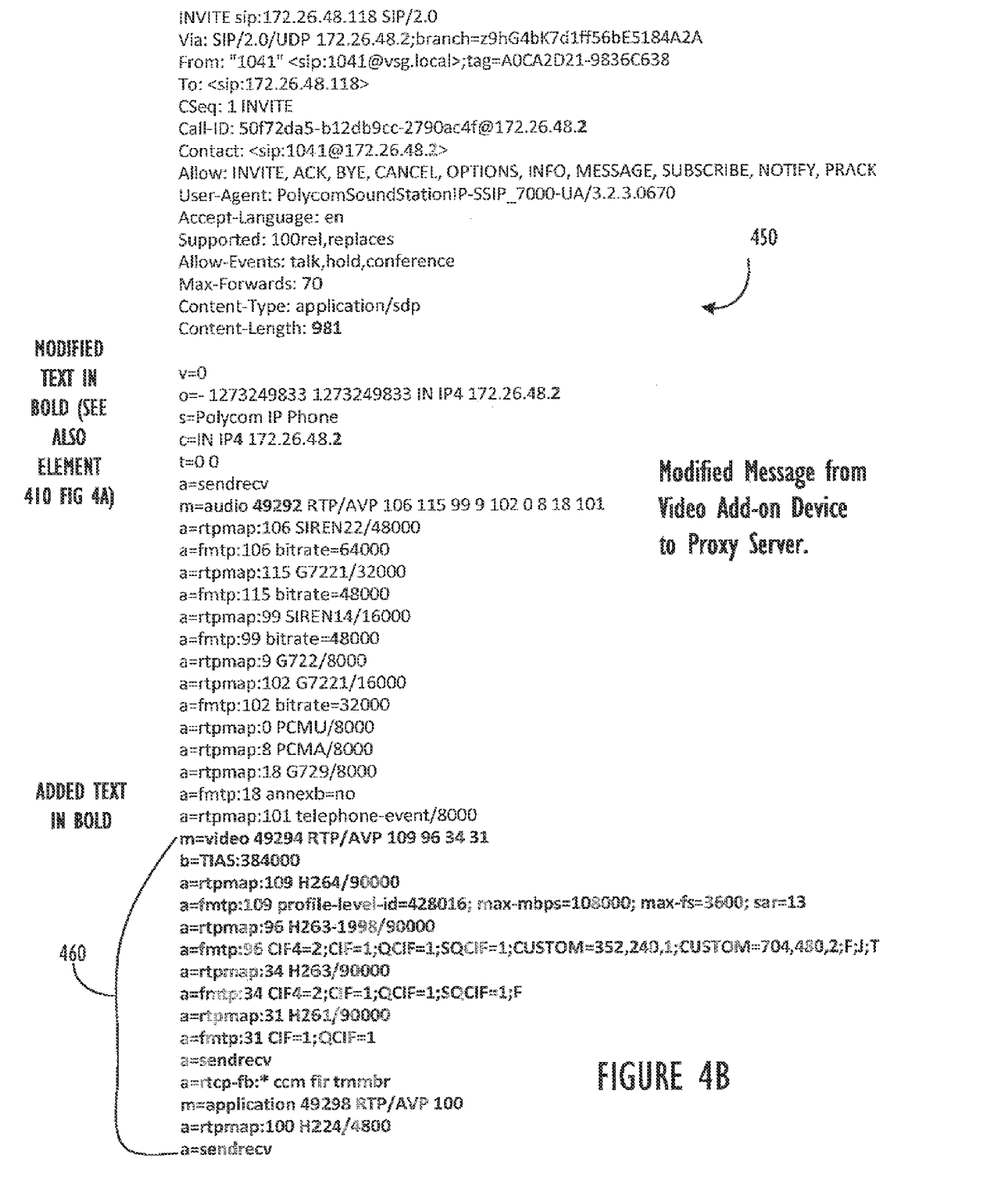

Referring now to FIGS. 4A-B, an example message from a SIP phone such as 105, 106 to a video add-on device such as 205, 206 and an example augmentation are shown. Message 400 shows an INVITE message as it might look from a SIP phone to a video add-on device. Lines (410) are the lines of the message that must be changed to account for the augmentation and response routing of the message. The content length attribute of the message is an example of "control information" that may be included in a SIP message. In this example, the content length must be changed to account for extra information and the m=audio line must be modified to the IP port being used by the video add-on device. In addition to changing parameters in the message attributes associated with the video data (e.g., far end camera controls) are added as lines 460 to the outbound message. These lines can be added/removed as the outbound/inbound messages are logically passed through the video conference add-on device 205, 206.

Although the above embodiments primarily deal with a SIP based phone, the disclosed method and system could also be implemented for a H.323 environment. In addition, the disclosed system and method could be used wherever SDP is used. SDP is also widely used with streaming of media with the Session Announcement Protocol (SAP) and Real-Time Streaming Protocol (RTSP). How the device inserts itself into the message path would be different for each protocol but would be understood by those of ordinary skill in the art, given the benefit of this disclosure, without requiring undue experimentation.

Figure 5:
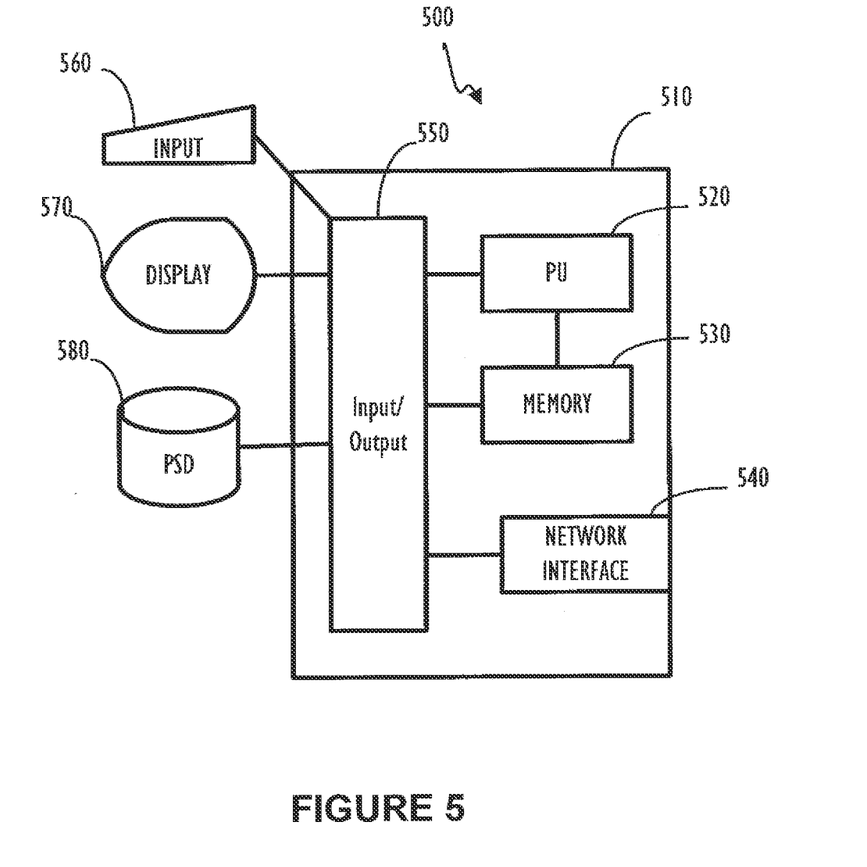
FIG. 5 shows, in block diagram form, a programmable control device comprising a processing unit as may be found in selected corporate IP capable devices.

Referring now to FIG. 5, an exemplary conferencing device 500 is shown. Exemplary conferencing device 500 comprises a programmable control device 510 which may be optionally connected to input 560 (e.g., keyboard, mouse, touch screen, etc.), display 570 or program storage device 580. Also, included with program device 510 is a network interface 540 for communication via a network with other conferencing and corporate infrastructure devices (not shown). Note network interface 540 may be included within programmable control device 510 or be external to programmable control device 510. In either case, programmable control device 510 will be communicatively coupled to network interface 540. Also note program storage unit 580 represents any form of non-volatile storage including, but not limited to, all forms of optical and magnetic storage elements including solid-state storage.

Program control device 510 may be included in a conferencing device and be programmed to perform methods in accordance with this disclosure (e.g., those illustrated in FIGS. 3-4). Program control device 510 comprises a processor unit (PU) 520, input-output (I/O) interface 550 and memory 530. Processing unit 520 may include any programmable controller device including, for example, the Intel Core®, Pentium® and Celeron® processor families from Intel and the Cortex and ARM processor families from ARM. (INTEL CORE, PENTIUM and CELERON are registered trademarks of the Intel Corporation. CORTEX is a registered trademark of the ARM Limited Corporation. ARM is a registered trademark of the ARM Limited Company.) Memory 530 may include one or more memory modules and comprise random access memory (RAM), read only memory (ROM), programmable read only memory (PROM), programmable read-write memory, and solid state memory. One of ordinary skill in the art will also recognize that PU 520 may also include some internal memory including, for example, cache memory.

Various changes in the materials, components, circuit elements, as well as in the details of the illustrated operational methods are possible without departing from the scope of the following claims. For instance, acts in accordance with FIGS. 2 and 4 may be performed by a programmable control device executing instructions organized into one or more modules (comprised of computer program code or instructions). A programmable control device may be a single computer processor (e.g., PU 520), a plurality of computer processors coupled by a communications link or one or more special purpose processors (e.g., a digital signal processor, DSP). Such a programmable control device may be one element in a larger data processing system such as a general purpose computer system. Storage media, as embodied in storage devices such as 580, as well as memory internal to program control device 510, suitable for tangibly embodying computer program instructions include, but are not limited to: magnetic disks (fixed, floppy, and removable) and tape; optical media such as CD-ROMs and digital video disks (DVDs); and semiconductor memory devices such as Electrically Programmable Read-Only Memory (EPROM), Electrically Erasable Programmable Read-Only Memory (EEPROM), Programmable Gate Arrays and flash devices. These are also sometimes referred to as computer readable medium or program storage devices.

In the above detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim.

Various changes in the details of the illustrated operational methods are possible without departing from the scope of the following claims. For instance, time line steps of FIGS. 2 and 4 may perform the identified steps in an order different from that disclosed here. Alternatively, some embodiments may combine the activities described herein as being separate steps. Similarly, one or more of the described steps may be omitted, depending upon the specific operational environment the method is being implemented in. In addition, acts in accordance with FIGS. 2 and 4 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs").

It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method comprising:
   receiving, at a first add-on device, a message from an endpoint device wherein the message indicates support of a first set of one or more capabilities;
   augmenting the message at the first add-on device to include information about a second set of capabilities, the second set of capabilities including an additional capability supported by the first add-on device, the additional capability not supported by the endpoint device;
   altering attributes of the message to make the message appear to other devices that the message originated at the first add-on device;
   altering control attributes of the message to be consistent with the included information; and
   forwarding the augmented message toward its specified destination.

2. The method of claim 1 wherein the additional capability includes support for data streams comprising video data.

3. The method of claim 1 wherein the additional capability includes support for data streams comprising electronic whiteboard capabilities.

4. The method of claim 1 wherein the endpoint device has been configured to identify the first add-on device as an outbound recipient of a data stream from the endpoint device.

5. The method of claim 1 wherein the endpoint device is an audio-only phone.

6. The method of claim 5 where the audio-only phone supports Session Initiation Protocol (SIP).

7. The method of claim 1 wherein the endpoint device supports H.323 protocol.

8. The method of claim 7 wherein the endpoint device is an audio-only phone.

9. A method comprising:
   configuring attributes of a SIP endpoint device, the attributes related to identifying a SIP Proxy/Registrar server;
   receiving, at a first add-on device, a message from the SIP endpoint wherein the message supports a first set of one or more capabilities;
   augmenting the message at the first add-on device to include information about a second set of capabilities, the second set of capabilities including an additional capability supported by the first add-on device, the additional capability not supported by the SIP endpoint device;
   altering attributes of the message to make the message appear to other devices that the message originated at the first add-on device;
   altering control attributes of the message to be consistent with the included information; and
   forwarding the augmented message toward its specified destination.

10. The method of claim 9 wherein the SIP endpoint device is an audio-only phone.

11. The method of claim 9 wherein the additional capability includes support for data streams comprising electronic whiteboard capabilities.

12. The method of claim 9 wherein the additional capability includes support for data streams comprising video data.

13. The method of claim 12 wherein the SIP endpoint device is an audio-only phone.

14. An add-on device comprising:
    a network interface communicatively coupled to a network; and
    a programmable control device communicatively coupled to the network interface and programmed to:
      receive a message from an endpoint device wherein the message supports a first set of one or more capabilities and identifies a specific destination;
      augment the message to include information about a second set of capabilities, the second set of capabilities including an additional capability supported by the add-on device, the additional capability not supported by the endpoint device;
      alter attributes of the message to make the message appear to other devices that the message originated at the add-on device;
      alter control attributes of the message to be consistent with the included information; and
      forward the augmented message along the network toward its specified destination.

15. The add-on device of claim 14 wherein the add-on device supports the Session Initiation Protocol (SIP).

16. The add-on device of claim 14 wherein the add-on device supports the H.323 protocol.

17. The add-on device of claim 14 wherein the second set of capabilities comprises video data capabilities.

18. The add-on device of claim 14 wherein the second set of capabilities comprises electronic whiteboard capabilities.

19. The add-on device of claim 14 further comprising:
    a video device for augmenting the capabilities of the endpoint device.

20. The add-on device of claim 19 wherein the video device comprises a video input device.

21. The add-on device of claim 19 wherein the video device comprises a video output device.

22. The add-on device of claim 14 wherein the programmable control device is further programmed to:
    receive a second message, the second message identifying the add-on device as a specific destination;
    process the second message to remove information about the second set of capabilities;
    alter address information in the second message to indicate the endpoint as a specified destination;
    alter control attributes of the second message to be consistent with the removed information; and
    forward the processed and altered second message along the network toward the endpoint.

23. The add-on device of claim 22 wherein the second set of capabilities comprises video data capabilities.

24. The add-on device of claim 22 wherein the second set of capabilities comprises electronic whiteboard capabilities.

\* \* \* \* \*